United States Patent Office 3,547,908
Patented Dec. 15, 1970

3,547,908
17β-HYDROXY-5α-ANDROSTANO[2,3-d]
IMIDAZOLES
Raymond O. Clinton, 300 E. 40th St.,
New York, N.Y. 10016
No Drawing. Filed Dec. 26, 1967, Ser. No. 693,109
Int. Cl. C07c 173/10
U.S. Cl. 260—239.5                               3 Claims

ABSTRACT OF THE DISCLOSURE

Reaction of 2-bromo - 5α - androstan-17β-ol-3-one with formamide, or with formamide and ammonia, gives 17β - hydroxy - 5α - androstano[2,3-d]imidazole. The latter and its esters have anabolic activity.

This invention relates to new steroid compounds, and in particular is concerned with 17β-hydroxy-5α-androstano[2,3-d]imidazole and esters thereof.

The compounds of the invention have the structural formula

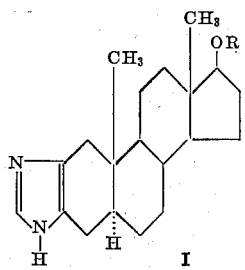

wherein R is hydrogen or carboxylic acyl having from one to twelve carbon atoms.

When R in the above Formula I stands for carboxylic acyl having from one to twelve carbon atoms, the acyl group preferably has a molecular weight less than about 250. Illustrative of the carboxylic acyl groups which can be present are lower-alkanoyl, e.g., acetyl, propionyl, isobutyryl, caproyl, heptanoyl, octanoyl, dodecanoyl, trimethylacetyl, and the like; carboxy-lower-alkanoyl, e.g., hemisuccinyl, hemiglutaryl, and the like; cycloalkyl-lower-alkanoyl wherein cycloalkyl has 5–6 ring members, e.g., β - cyclopentylpropionyl, β - cyclohexylpropionyl, and the like; benzoyl; phenyl - lower-alkanoyl or -alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl and N,N-di-lower-alkylcarbamyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups can preferably have from one to four carbon atoms.

17β - hydroxy - 5α - androstano[2,3-d]imidazole (I; R is H) can be prepared by reacting 2-bromo-5α-androstan-17β-ol-3-one with formamide. The 2-bromo-5α-androstan-17β-ol-3-one is in turn prepared by bromination of 5α-androstan-17β-ol-3-one with elementary bromine or with pyridinium bromide perbromide.

The reaction between 2-bromo - 5α - androstan-17β-ol-3-one and formamide can be carried out by heating together the reactants, using a large excess of formamide, at a temperature between about 150° and 250° C., preferably in the presence of anhydrous ammonia. In fact, the bromination and condensation with formamide can be carried out in a single reaction vessel, starting with a formamide solution or suspension of 5α-androstan-17β-ol-3-one.

The compounds of Formula I wherein R is carboxylic acyl are prepared from the compound of Formula I wherein R is hydrogen by conventional esterification reactions using the appropriate acid anhydride or acid halide.

The structures of the compounds of the invention were established by the modes of synthesis, by elementary analysis, and by ultraviolet, infrared and NMR spectra.

Endocrinological evaluation of the compounds of the invention by standard methods has shown that they possess anabolic activity. The anabolic activity was measured on the basis of nitrogen retention in weight- and nitrogen-equilibrated castrated adult male rats upon oral administration [method described by Arnold et al., Proc. Soc. Exptl. Biol. & Med 102, 184 (1959)].

The actual determination of the numerical biological data definitive for a particular compound is readily obtained by standard test procedures by technicians having ordinary skill in pharmacological test procedures, without the need for any extensive experimentation. The compounds of the invention are effective in amounts of 1–100 mg. per dosage unit depending upon the compound used and the manner of administration. They are prepared for use by conventional pharmaceutical formulation procedures used to formulate other steroid hormones; that is, in capsule or tablet form with conventional excipients (for example, calcium carbonate, starch, lactose, talc, magnesium stearate, gum acacia, and the like) for oral administration; or as an aqueous or oil suspension in a pharmaceutically acceptable vehicle (aqueous alcohol, glycol, oil solution, or oil-water emulsion) for parenteral administration.

The following examples will further illustrate the invention without the latter being limited thereby.

EXAMPLE 1

(a) 2-bromo-5α-androsta-17β-ol-3-one

To a solution of 15.0 g. of 5α-androstan-17β-ol-3-one in 75 ml. of acetic acid containing 2 drops of 3% hydrogen bromide in acetic acid was added over a period of 30 minutes at room temperature a solution of 19.21 g. of pyridinium bromide perbromide and 6.35 g. of sodium acetate in 125 ml. of acetic acid. A solution of 10 g. of sodium acetate in 50 ml. of water was added and the mixture added to 3 liters of ice-water. After one hour, the solid product was collected by filtration, washed with water, dried, and recrystallized from acetone to give 10.4 g. of 2-bromo-5α-androstan-17β-ol-3-one, M.P. 160–173° C. (dec.).

(b) 17β-Hydroxy-5α-androstano[2,3-imidazole
[I; R is H]

A mixture of 10.4 g. of 2-bromo-5α-androstan-17β-ol-3-one and 150 ml. of formamide was heated quickly to 194° C. The mixture was held at that temperature for two hours, then cooled and quenched in cold water. The solid product was collected by filtration, washed with water, dried at 70° C. and extracted with boiling ethyl acetate. The ethyl acetate extracts upon cooling caused separation of a mixture of crystals and gum. Methanol was added and the gum dissolved. The crystals were removed by filtration, and the filtrate was concentrated, while adding benzene and the ethylene dichloride to remove traces of ethyl acetate. The residue was placed on a column of 300 g. of adsorbant containing 2 parts of activated magnesium silicate to 1 part of infusorial earth, and the column was eluted with 400 ml. fractions as follows: 1–10 (methylene dichloride), 11–15 (1% acetone in methylene dichloride), 16–35 (2.5% acetone in methylene dichloride), 36–46 (5% acetone in methylene dichloride), 47–50 (7.5% acetone in methylene dichloride), 51–55 (10% acetone in methylene dichloride), 56–57 (20% acetone in methylene dichloride) and 58–82 (25% acetone in methylene dichloride). The material from fractions 60–68 was isolated and recrystallized from methanol, ethanol and pyridine-methanol to give 17β-hydroxy - 5α - androstano[2,3 - d]imidazole, M.P. 187–200° C.

EXAMPLE 2

17β-acetoxy-5α-androstano[2,3-d]imidazole
[I; R is COCH$_3$]

Bromine (15.98 g.) was added over a period of one hour to a stirred mixture of 29.04 g. of 5α-androstan-17β-ol-3-one and 300 ml. of formamide held at 60–70° C. The solution was heated to 100° C., a stream of anhydrous ammonia introduced, and the temperature gradually increased to 160–170° C. over a one-hour period. The reaction mixture was stirred for five hours at 160–170° C. while continuing the addition of ammonia, then cooled and poured into 2 liters of deionized water containing 40 ml. of concentrated hydrochloric acid. The mixture was allowed to stand overnight, then filtered, and the filtrate made basic to about pH 9 with concentrated ammonium hydroxide. The solid was collected, washed with water, dried, and dissolved in a mixture of 40 ml. of pyridine and 20 ml. of acetic anhydride. The latter solution was kept overnight at room temperature and then added to 600 ml. of ice-water. The solid product was collected and dissolved in methylene dichloride, and the methylene dichloride solution washed with water, dried over anhydrous sodium sulfate, filtered and chromatographed on 210 g. of silica gel. The column was eluted with 400 ml. fractions as follows: 1–11 (ether), 12–33 (5% ether in methanol). The material from fractions 19–26 was extracted with a methylene dichloride-chloroform mixture. The soluble portion was obtained by concentration of the extracts, and the residue was recrystallized twice from methanol-ethyl acetate to give 17β-acetoxy-5α-androstano[2,3-d]imidazole, M.P. 299–301° C. (dec.); [α]$_D^{25}$ =+40.4° (1% in chloroform).

By replacing the acetic anhydride in the foregoing preparation by a molar equivalent amount of succinic anhydride, caproyl chloride, β-cyclohexylpropionyl chloride, p-nitrobenzoyl chloride, β-phenylpropionyl chloride, cinnamoyl chloride, p-chlorophenoxyacetyl chloride or nicotinoyl chloride, there can be obtained, respectively, 17β-(β-carboxypropionoxy) - 5α - androstano[2,3-d]imidazole [I; R is COCH$_2$CH$_2$COOH],
17β - caproyloxy - 5α-androstano[2,3-d]imidazole
   [I; R is CO(CH$_2$)$_4$CH$_3$],
17β - (β - cyclohexylpropionoxy) - 5α-androstano[2,3-d]-
   imidazole [I; R is COCH$_2$CH$_2$C$_6$H$_{11}$],
17β - (p-nitrobenzoyloxy)-5α-androstano[2,3-d]imidazole
   [I; R is COC$_6$H$_4$NO$_2$-p],
17β - (β - phenylpropionyloxy)-5α-androstano[2,3-d]
   imidazole [I: R is COCH$_2$CH$_2$C$_6$H$_5$],
17β-cinnamoyloxy-5α-androstano[2,3-d]imidazole
   [I; R is COCH=CHC$_6$H$_5$],
17β - (p - chlorophenoxyacetoxy) - 5α-androstano[2,3-d]-
   imidazole [I; R is COCH$_2$OC$_6$H$_4$Cl-p], or
17β-nicotinoyloxy-5α-androstano[2,3-d]imidazole
   [I; R is COC$_5$H$_4$N].

I claim:
1. A compound of the formula

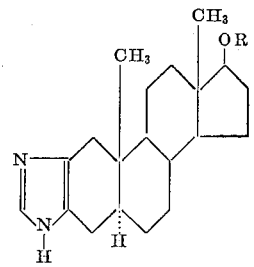

wherein R is hydrogen or carboxylic acyl having from one to twelve carbon atoms.

2. 17β - hydroxy - 5α - androstano[2,3-d]imidazole, according to claim 1 wherein R is hydrogen.

3. 17β-acetoxy-5α-androstano[2,3-d]imidazole, according to claim 1 wherein R is acetyl.

References Cited

UNITED STATES PATENTS 3,280,113  10/1966  Christiansen et al.
3,341,522  9/1967  de Ruggieri et al.

HENRY A. FRENCH, Primary Examiner

U.S. Cl. X.R.

260—397.4, 999

PO-1050
(5/69)

UNITED STATES PATENT OFFICE
CERTIFICATE OF CORRECTION

Patent No. 3,547,908           Dated December 15, 1970

Inventor(s) Raymond O. Clinton

It is certified that error appears in the above-identified patent and that said Letters Patent are hereby corrected as shown below:

Column 1, line 5, in heading after "10016" insert: --, assignor to Sterling Drug Inc., New York, N.Y., a corporation of Delaware--.

Column 2, line 42, "androsta-" should read --androstan- -- line 56, "[2,3-" should read --[2,3-d]--.

Column 4, line 16, "$COCH_2OC H_4Cl-p$" should read --$COCH_2OC_6H_4Cl-p$--.

Signed and sealed this 6th day of April 1971.

(SEAL)
Attest:

EDWARD M. FLETCHER, JR.
Attesting Officer

WILLIAM E. SCHUYLER, JR.
Commissioner of Patents